June 24, 1958

H. D. CRANDON ET AL 2,840,535

ARYL PHOSPHATE PLASTICIZED ALKYD RESIN
ADHESIVE COMPOSITIONS AND
METHOD OF PREPARING

Filed May 21, 1953

INVENTOR
HARRY D. CRANDON
THOMAS E. BURGESS
BY
Louis L. Gagnon
ATTORNEY

United States Patent Office 2,840,535
Patented June 24, 1958

2,840,535

ARYL PHOSPHATE PLASTICIZED ALKYD RESIN ADHESIVE COMPOSITIONS AND METHOD OF PREPARING

Harry D. Crandon, Woodstock, Conn., and Thomas E. Burgess, Southbridge, Mass., assignors to American Optical Company, Southbridge, Mass., a voluntary association of Massachusetts Application May 21, 1953, Serial No. 356,351

14 Claims. (Cl. 260—30.6)

This application relates to improved cementitious materials for bonding transparent elements and has particular reference to cements used for adhesively joining transparent elements to form articles such as composite ophthalmic lenses or the like, and method of making such cements.

One of the principal objects of this invention is to provide a non-volatile highly transparent cementitious material for bonding together articles of a transparent nature such as glass or certain plastic materials, which cementitious material is of a stable nature and can be made and used by conventional procedures.

Another object is to provide a cementitious material which is particularly efficient in bonding together the elements of composite ophthalmic lenses wherein it is essential that the cementitious material be of a permanent stable nature such as will prevent separation or relative movement of the bonded elements and also possess a high degree of water resistance.

Another object is to provide such a cementitious material for efficiently uniting the elements of composite articles of a transparent nature, such as ophthalmic lenses, without the presence of air bubbles or edge air pockets and which provides a relatively inseparable moisture-resistant bond.

Another object is to provide a cementitious material of the above character which is comprised of a composition containing a controlled amount of the polymer of diethylene glycol and maleic acid cross-linked with diallyl phthalate having added thereto a controlled amount of a hydrophobic plasticizer which is compatible therewith over a wide range of temperatures, which composition can be readily formed and handled and can be cured, by conventional use of catalysts, in ultra-violet light or heat.

A further object is to provide a cementitious material which is readily and easily formed by conventional methods and of readily available ingredients.

Other objects and advantages of the invention will become apparent from the following description taken in connection with the accompanying drawing in which, Fig. 1 is a fragmentary perspective view of a two-element lens laminated with a cement such as disclosed herein;

Figure 1:
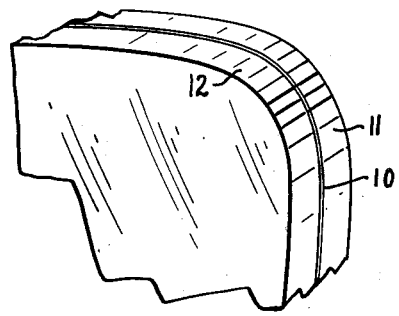

In the past when manufacturing articles such as ophthalmic lenses embodying laminations of glass or glass and plastic materials, it has been common practice to use selected adhesives for cementing the parts of the lenses together. This is done, for example, when forming so-called "iseikonic" lenses which embody two separate preshaped lenses laminated together, or when providing ophthalmic lenses with bifocal segments, or when forming special light absorbing lenses by cementing a light-altering film on the surface of a lens or between laminations of glass or other similar transparent material.

Many types of cements have been used for these purposes, for example thermoplastic resins, such as butyl methacrylate, cyclohexyl methacrylate, etc. and thermosetting resins such as diallyl diglycol dicarbonate, which are polymerized in situ. These are generally unsatisfactory because of the difficult methods required for use in certain cases, the requirement of long curing times at controlled temperatures and under controlled atmospheric conditions, and also because of their relatively low degree of water resistance.

Other prior art compositions such as plasticized polyvinyl butyral polymers also commonly used as cements are generally unsatisfactory due to the fact that they are not water resistive and also such cements have indices of refraction substantially different from the glass generally used in forming articles such as lenses.

The present invention overcomes these objections by providing an improved substantially colorless cement of a relatively permanent stable nature which can be made and cured at normal temperatures in short periods of time and in normal atmospheres, which is of a low shrinkage type, provides an excellent bond, has an index of refraction which approximates that of glass used in forming such laminated structures, and has a high degree of water resistance.

In making a cement in accordance with this invention, a polyester resin such as the polymer of diethylene glycol and maleic acid cross-linked with diallyl phthalate in the desired amount is initially mixed with the desired amount of a hydrophobic plasticizer such as tricresyl phosphate or cresyl diphenyl phosphate. The resin in this composition provides exceptionally good low shrinkage bonding and also serves as a suitable base for the plasticizer. The plasticizer functions to provide the resultant cement with the desired water resistance and must be held to within a fairly critical range. For example, using a mixture comprised of approximately 80% resin and 20% plasticizer, the resultant cement will possess the best bonding, water resistance, and other desired characteristics. However, it has been found that increasing amounts of plasticizer causes resulting increase in water resistance up to inclusion of more than about 25% plasticizer, with consequent decrease percentagewise in resin, which provides a composition wherein the plasticizer is not compatible at relatively low temperatures such as $-60°$ F. Likewise, decreases in plasticizer result in decreases in water resistance to a point where inclusion of less than about 15% of plasticizer results in a cement having relatively poor water resistance. Therefore, to provide a cement having the required characteristics in accordance with this invention the resin and plasticizer may be varied as follows:

Resin approximately from 75% to 80%
Plasticizer approximately from 15% to 25%

The selected ingredients are thoroughly mixed in the desired amounts and the mixture may then be stored if desired. It is to be understood that when forming this mixture, which may be done at normal room temperatures, all stirring and mixing should be done carefully to prevent formation of air bubbles.

Figure 3:
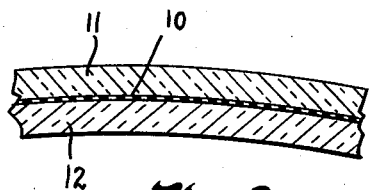
Figs. 3 and 4 are sectional views of the lenses shown in Figs. 1 and 2 respectively.

Prior to the time of using the above mixture as a cement it is necessary to add thereto an amount, preferably .5% of a catalyst such as tertiary-butyl hydroperoxide or benzoyl peroxide to start reaction of the ingredients with one another. Then the cement is ready for use such as by providing a layer 10 thereof between superimposed layers 11 and 12 of glass or other similar transparent materials to form articles such as a laminated ophthalmic lens as shown in Figs. 1 and 3 of the drawing wherein like characters of reference designate like parts throughout the several views.

The lens produced in accordance with the foregoing is then cured by heating for approximately one hour at approximately 110° C. Curing can also be done in ultra-violet light if desired with the time cycle being controlled in accordance with the intensity of the ultra-violet radiation and the thickness of the laminations through which the ultra-violet light must pass to reach the layer of cement.

Figure 2:
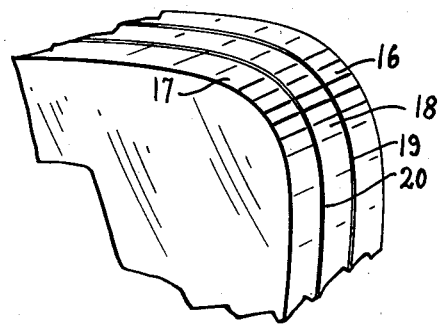
Fig. 2 is a fragmentary perspective view of a multi-element lens.
Figure 4:
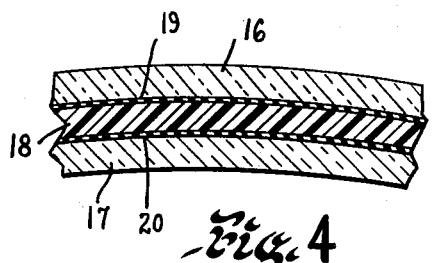
Figure 5:
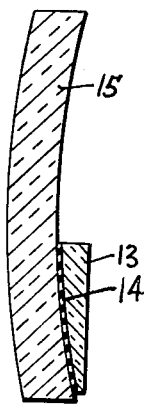
Fig. 5 is a sectional view of a lens having a bifocal segment thereon.

A bifocal segment 13 (Fig. 5) can also be attached by a layer 14 of the cement to a surface of a lens blank 15. Also lenses may be formed with two superimposed layers of glass 16—17 (Figs. 2 and 4) having a layer 18 of transparent plastic material attached to the adjacent surfaces thereof by layers 19—20 of the cement.

Although ophthalmic lenses have been shown and described hereinbefore as the principal products with which the presently disclosed cement is contemplated for use, it is to be understood that the production of many other products may involve the use of this cement such as composite mirrors, to join and hermetically seal the components of electronic tubes or other devices embodying a plurality of parts formed of transparent materials.

It will be understood that a cement formed as described will possess all the aforementioned improvements over prior art cements formed of known thermoplastic or thermosetting resin compositions.

In the tables given hereinafter it is to be understood that the resin referred to is the polymer of diethylene glycol and maleic acid cross-linked with diallyl phthalate.

Table A which follows is a formula for producing the preferred cement composition:

Table A

| Ingredient: | Percent |
|---|---|
| Resin | 80 |
| Tricresyl phosphate | 20 |
| | 100 |

While the formula in Table A produces the preferred cement, it is to be understood that the proportions of the various ingredients can be varied somewhat with the resultant cement still being of a satisfactory nature for some of the uses described above. This is indicated in Table B wherein ranges of the proportions are given:

Table B

| Ingredient: | Percent |
|---|---|
| Resin | 75–85 |
| Tricresyl phosphate | 15–25 |

Another formula producing satisfactory cements in accordance with this invention is:

Table C

| Ingredient | Preferred, Percent | Range of, Percent |
|---|---|---|
| Resin | 80 | 75–85 |
| Cresyl Diphenyl Phosphate | 20 | 15–25 |

In each case the catalyst selected from the types mentioned hereinbefore is added to the composition before using to promote curing. Although it has been found that .5% of the catalyst is sufficient to cause the desired reaction, it is to be understood that more catalyst may be used, up to the solubility of the composition, or less may be used with possible slowing up of the desired reaction process.

From the foregoing it will be seen that there is produced an improved cement in accordance with all of the objects and advantages of this invention which can be used in making improved objects such as laminated lenses and the like formed of layers or other components of glass, plastics, or glass and plastic materials.

An article such as a lens, for example, comprised of laminations bonded together by this cement must be sufficiently well bonded as to exhibit no indication of parting at the bond after being cracked or broken and subsequently closely examined. Also, no indication of edge separation should be evidenced following a first test consisting of three cycles of eight hours at 160° F. and 95% relative humidity followed by sixteen hours at room temperature, a second test consisting of immersion for one hour in boiling water, and a third test consisting of 24 hours in water at 100° F. followed by 24 hours subjection to −55° F. temperature, then 24 hours at 160° F. and 95% relative humidity, then 24 hours under ultra-violet light, and finally 24 hours at 160° F. dry heat.

While certain novel features of the invention have been shown and described and are pointed out in the annexed claims, it will be understood that various omissions, substitutions and changes in the forms and details of the means and methods illustrated and described and in the formulae recited may be made by those skilled in the art without departing from the spirit of the invention.

We claim:

1. A transparent water resistive cement for joining transparent elements comprising approximately from 75 to 85% of a resin comprising the polymer of diethylene glycol and maleic acid cross-linked with diallyl phthalate, and said resin being plasticized with approximately from 15% to 25% of a hydrophobic aryl compound selected from the group consisting of tricresyl phosphate and cresyl diphenyl phosphate compatible with the resin over a relatively wide range of temperatures for rendering the resin resistant to water.

2. A transparent water resistive cement for joining transparent elements comprising approximately from 75 to 85% of a resin comprising the polymer of diethylene glycol and maleic acid cross-linked with diallyl phthalate and approximately from 15 to 25% of tricresyl phosphate.

3. A transparent water resistive cement for joining transparent elements comprising approximately from 75 to 85% of a resin comprising the polymer of diethylene glycol and maleic acid cross-linked with diallyl phthalate, and approximately from 15 to 25% of cresyl diphenyl phosphate to render the resin resistant to water.

4. A transparent water resistive cement for joining transparent elements comprising approximately 80% of a resin comprising the polymer of diethylene glycol and maleic acid cross-linked with diallyl phthalate, and plasticized with approximately 20% of a hydrophobic aryl phosphate selected from the group consisting of tricresyl phosphate and cresyl diphenyl phosphate compatible with the resin over a relatively wide range of temperatures to render said polymer resistant to water.

5. A transparent water resistive cement for joining transparent elements comprising approximately 80% of a resin comprising the polymer of diethylene glycol and maleic acid cross-linked with diallyl phthalate, and approximately 20% of tricresyl phosphate.

6. A transparent water resistive cement for joining transparent elements comprising approximately 80% of a resin comprising the polymer of diethylene glycol and maleic acid cross-linked with diallyl phthalate, and approximately 20% of cresyl diphenyl phosphate.

7. A transparent water resistive cement for joining transparent elements comprising approximately from 75% to 85% of a resin comprising the polymer of diethylene glycol and maleic acid cross-linked with diallyl phthalate, and approximately from 15% to 25% of a hydrophobic plasticizer selected from the group consisting of tricresyl phosphate and cresyl diphenyl phosphate.

8. A transparent water resistive cement for joining transparent elements comprising approximately 80% of a resin comprising the polymer of diethylene glycol and maleic acid cross-linked with diallyl phthalate, and approximately 20% of a hydrophobic plasticizer selected from the group consisting of tricresyl phosphate and cresyl diphenyl phosphate.

9. A transparent substantially colorless water resistant low shrinkage cement of a relatively permanent stable nature comprising the polymer of diethylene glycol and maleic acid cross-linked with diallyl phthalate, said polymer being plasticized with from 15 to 25% by weight of aryl phosphate selected from the group consisting of tricresyl phosphate and cresyl diphenyl phosphate as to be water resistant and compatible with the polymer through a wide range of temperatures, said cement having a refractive index approaching that of glass.

10. The method of forming a highly transparent water resistive cement for use in joining transparent elements comprising providing a mixture of approximately from 75 to 85% of a resin comprising the polymer of diethylene glycol and maleic acid cross-linked with diallyl phthalate, and approximately from 15 to 25% of a hydrophobic aryl compound plasticizer selected from the group consisting of tricresyl phosphate and cresyl diphenyl phosphate compatible therewith over a relatively wide range of temperatures, and subsequently adding thereto a catalyst selected from a group consisting of tertiary-butyl hydroperoxide and benzoyl peroxide which will cause a curing reaction of said ingredients.

11. The method of forming a highly transparent water resistive cement for use in joining transparent elements comprising mixing approximately from 75 to 85% of a resin comprising the polymer of diethylene glycol and maleic acid cross-linked with diallyl phthalate with approximately from 15 to 25% of tricresyl phosphate to render the resin resistant to water, and subsequently adding thereto a peroxide as a catalyst selected from a group consisting of tertiary-butyl hydroperoxide and benzoyl peroxide for causing a reaction of said ingredients.

12. The method of forming a highly transparent water resistive cement for use in joining transparent elements comprising mixing approximately from 75 to 85% of a resin comprising the polymer of diethylene glycol and maleic acid cross-linked with diallyl phthalate with approximately from 15 to 25% of cresyl diphenyl phosphate to render the resin resistant to water and subsequently adding thereto a peroxide as a catalyst selected from a group consisting of tertiary-butyl hydroperoxide and benzoyl peroxide for causing a reaction of said ingredients.

13. The method of forming a highly transparent water resistive cement for use in joining transparent elements comprising mixing approximately 80% of a resin comprising the polymer of diethylene glycol and maleic acid cross-linked with diallyl phthalate and approximately 20% of a plasticizer selected from the group consisting of tricresyl phosphate and cresyl diphenyl phosphate compatible therewith over a relatively wide range of temperatures to render the resin resistant to water, and subsequently adding thereto a catalyst selected from the group consisting of tertiary-butyl hydroperoxide and benzoyl peroxide for causing a reaction of said ingredients.

14. The method of forming a highly transparent water resistive cement for use in joining transparent elements comprising forming a mixture of approximately 80% of a resin comprising the polymer of diethylene glycol and maleic acid cross-linked with diallyl phthalate to which is added approximately 20% of tricresyl phosphate to render the resin resistant to water, and subsequently adding thereto a catalyst selected from the group consisting of tertiary-butyl hydroperoxide and benzoyl peroxide for causing a reaction of said ingredients.

References Cited in the file of this patent

UNITED STATES PATENTS

| | | |
|---|---|---|
| 2,220,621 | Ellis | Nov. 5, 1940 |
| 2,443,736 | Kropa | June 22, 1948 |
| 2,453,666 | Kropa | Nov. 9, 1948 |
| 2,549,732 | Weaver | Apr. 17 1951 |